(12) United States Patent
Dobson et al.

(10) Patent No.: US 8,009,034 B2
(45) Date of Patent: Aug. 30, 2011

(54) INTEGRATED TRACKING, SENSING, AND SECURITY SYSTEM FOR INTERMODAL SHIPPING CONTAINERS

(75) Inventors: Eric L. Dobson, Knoxville, TN (US); Joel K. Reed, Knoxville, TN (US)

(73) Assignee: TrakLok Corporation, Knoxville, TN (US)

( * ) Notice: Subject to any disclaimer, the term of this patent is extended or adjusted under 35 U.S.C. 154(b) by 413 days.

(21) Appl. No.: 12/313,428

(22) Filed: Nov. 20, 2008

(65) Prior Publication Data

US 2009/0134999 A1    May 28, 2009

Related U.S. Application Data

(60) Provisional application No. 61/004,265, filed on Nov. 26, 2007.

(51) Int. Cl.
*G08B 1/08* (2006.01)
(52) U.S. Cl. ............... 340/539.1; 340/539.13; 340/540; 340/545.1
(58) Field of Classification Search ............... 340/539.1, 340/539.13, 572.1, 539.17, 541, 542, 545.1
See application file for complete search history.

(56) References Cited

U.S. PATENT DOCUMENTS

| | | | |
|---|---|---|---|
| 4,422,313 A | 12/1983 | VanderWyde | |
| 5,116,091 A | 5/1992 | Swift | |
| 5,406,263 A | 4/1995 | Tuttle | |
| 5,528,228 A | 6/1996 | Wilk | |
| 5,648,763 A * | 7/1997 | Long | ........................... 340/5.73 |
| 5,755,175 A | 5/1998 | White | |
| 5,825,283 A | 10/1998 | Camhi | |
| 5,831,531 A | 11/1998 | Tuttle | |
| 5,939,982 A | 8/1999 | Gagnon | |
| 6,069,563 A | 5/2000 | Kadner | |
| 6,148,291 A | 11/2000 | Radican | |
| 6,259,352 B1 | 7/2001 | Yulkowski | |
| 6,364,584 B1 | 4/2002 | Taylor | |
| 6,384,709 B2 * | 5/2002 | Mellen et al. | .................. 340/5.2 |
| 6,464,269 B1 | 10/2002 | Wilhelm | |
| 6,513,842 B1 | 2/2003 | Fuehrer | |
| 6,577,921 B1 | 6/2003 | Carson | |
| 6,581,419 B1 | 6/2003 | Strodtman | |
| 6,581,425 B1 | 6/2003 | Brown | |
| 6,662,068 B1 | 12/2003 | Ghaffari | |
| 6,846,024 B1 | 1/2005 | Palzkill | |
| 6,928,843 B1 | 8/2005 | Pirnie | |
| 6,972,682 B2 | 12/2005 | Lareau | |
| 6,975,224 B2 | 12/2005 | Galley | |
| 6,987,441 B2 | 1/2006 | Roeland | |
| 7,044,512 B1 | 5/2006 | Moreno | |
| 7,165,722 B2 | 1/2007 | Shafer | |

(Continued)

*Primary Examiner* — Eric M Blount
(74) *Attorney, Agent, or Firm* — Robert J. Lauf

(57) ABSTRACT

A security system for freight containers comprises: a locking device to reliably attach to the container and prevent unauthorized opening of the container doors; a sensing device to sense conditions affecting the container; and, a communication system configured to transmit the output of the sensing device to a system administrator located remotely from the container. The locking and sensing devices may be capable of two-way communication with the system administrator, whereby the administrator may interrogate the locking/sensing device at selected times. The locking device may contain a GPS receiver whereby its geographic location at various times may be monitored either continuously, periodically, or after a trip is completed. The system may include a visual display on the exterior of the container capable of displaying selected messages. The messages may be preprogrammed or may be changed as the container moves from one geographic location to another.

14 Claims, 7 Drawing Sheets

U.S. PATENT DOCUMENTS

| | | |
|---|---|---|
| 7,178,841 B1 | 2/2007 | Moreno |
| 7,221,668 B2 | 5/2007 | Twitchell |
| 7,242,322 B2 | 7/2007 | Neher |
| 7,455,225 B1 * | 11/2008 | Hadfield et al. .............. 235/384 |
| 7,696,869 B2 * | 4/2010 | Brown ..................... 340/539.22 |
| 2003/0179073 A1 * | 9/2003 | Ghazarian ..................... 340/5.6 |
| 2004/0178880 A1 * | 9/2004 | Meyer et al. ................. 340/5.22 |
| 2005/0044906 A1 * | 3/2005 | Spielman ...................... 340/5.7 |
| 2005/0141594 A1 | 6/2005 | Smith |
| 2005/0248454 A1 | 11/2005 | Hansen |
| 2007/0109097 A1 * | 5/2007 | Coutermarsh et al. ....... 340/5.73 |

* cited by examiner

INTEGRATED TRACKING, SENSING, AND SECURITY SYSTEM FOR INTERMODAL SHIPPING CONTAINERS

CROSS-REFERENCE TO RELATED APPLICATIONS

This application claims the benefit of Provisional Patent Application No. 61/004,265 by the present inventors, filed on Nov. 26, 2007, the entire disclosure of which is incorporated herein by reference.

This application contains material disclosed in part in U.S. patent application Ser. No. 12/313,427 filed by the present inventors on even date herewith, the entire disclosure of which is incorporated herein by reference.

BACKGROUND OF THE INVENTION

1. Field of the Invention

The invention pertains to apparatus and methods related to the movement of international cargo in containerized structures. More particularly, the invention relates to tracking and security of ISO compliant intermodal shipping containers.

2. Description of Related Art

There are an estimated 15 million intermodal shipping containers moving throughout the world on a daily basis. Nine million of these containers arrive at U.S. ports annually, raising significant security issues. If a weapon of mass destruction were delivered to a port in the U.S., the cost to the domestic economy could reach $1 trillion.

Security applications, such as cargo tracking are growing in importance. The worldwide ocean-going freight transportation infrastructure is the cornerstone of the global economic well-being and has been in crisis since Sep. 11, 2001. Domestic shipping via the Marine Transportation System (MTS) totals over $850 B in cargo annually and contributes $2 T to the U.S. gross domestic product. The current volume of domestic maritime shipping is expected to double over the next 20 years. International maritime shipping is expected to triple over the same time period. Many port facilities are under economic stress from several fronts, including antiquated technology, environmental restrictions, just-in-time manufacturing practices, overlapping federal/state/local jurisdictions, and the lack of basic technological infrastructure to orchestrate a global network for intermodal asset security monitoring and tracking. Land competition and environmental regulations will further restrict the geographic expansion of current port facilities. Further, the information systems for managing the supply chain still largely depend on manual data entry processes.

In addition to concerns about MTS economic inefficiencies, a renewed emphasis on homeland security in the U.S. is evident. Terrorist threats have brought about a new reality in the MTS. Attacks will likely focus on economic means to effect change in the modern world. One need only look to the open movement of containerized cargo to find simple, effective, and efficient means of large-scale economic damage. The destruction of a few key ports could bring our economy to a complete halt and cripple the nation in a matter of weeks. The result is a conflict between efficiency and security in the port system that supports the MTS.

A well-documented need exists for technology solutions to increase efficiency and security in the MTS. In 2004, 9 million containers entered the U.S. via the MTS. U.S. Customs inspects less than 5 percent of these containers manually, relying on intelligence to "profile" containers. The Coast Guard and U.S. Customs do not have the resources to inspect each container entering the U.S. Therefore, investment in appropriate tracking and monitoring technology will be needed to increase security and economic efficiency. Neither efficiency nor security can be sacrificed. Therefore, tracking and monitoring technologies must be developed to provide greater efficiency and at the same time secure the global supply chain.

The ability to monitor conditions and location in real-time has a number of insurance ramifications. The insurers of ships and cargo are critically interested in loss and theft of cargo via security breaches and fraud. For the 12 months prior to Nov. 30, 2004, $700 billion in cargo was shipped via the MTS. Some private industry estimates of losses overboard, damage, or outright theft are as high as seven to ten percent of all containers annually, as high as $40 billion per year losses in the supply chain. Insurance companies finance a great deal of this expense, and in turn, pass along these losses as premiums and retained losses to cargo owners, carriers, and ultimately the consumer. Carriers, cargo owners and the manufacturers absorb the remaining losses that are again ultimately passed along to end consumers. Entities in the distribution chain would be expected to receive a lower insurance premium for shipping through a more secure service provider.

Current products on the commercial market for logistics applications and container security offer little security. Electronic seals, which are wireless enabled versions of mechanical seals that have been used for decades, do not provide the means to secure the container.

Various types of seals have been described including: Swift U.S. Pat. No. 5,116,091; Tuttle U.S. Pat. Nos. 5,406,263 and 5,831,531; Wilk U.S. Pat. No. 5,528,228; White U.S. Pat. No. 5,755,175; Gagnon U.S. Pat. No. 5,939,982; Kadner U.S. Pat. No. 6,069,563; Wilhelm U.S. Pat. No. 6,464,269; Fuehrer U.S. Pat. No. 6,513,842; Palzkill U.S. Pat. No. 6,846,024; Pirnie U.S. Pat. No. 6,928,843; and Moreno U.S. Pat. Nos. 7,044,512 and 7,178,841. Generally seals focus on detecting tampering rather than providing true locking mechanisms. At best the seal serves as a deterrent and at worst it potentially conveys a false sense of security. Several studies have examined seals and found they offer little or no security in their current forms, only serving a deterrent function.

Various types of locks have been described, including: VanderWyde U. S. Pat. No. 4,422,313; Yulkowski U.S. Pat. No. 6,259,352; Strodtman U.S. Pat. No. 6,581,419; and Brown U.S. Pat. No. 6,581,425. These solutions tend to focus on permanent retrofit/installation of hardware to ISO standard containers but raise expensive and substantial installation and maintenance issues. Containers are leased; shippers have little or no ability to implement these solutions. Container owners/lessors have little or no incentive to implement them because it represents a net cost to operations.

In U.S. Pat. No. 6,364,584, Access Bar for a Shipping Container, Taylor describes a system that secures both doors at the same time and uses the corner posts as a "gravity" locking mechanism.

A locking and tracking system as taught by Galley in U.S. Pat. No. 6,975,224, Reusable Self Container Electronic Device Providing In-Transit Cargo Visibility, attaches to the door latch and would require two devices (one for each door) to work.

Various types of tracking systems have been described, including the following: Camhi, in U.S. Pat. No. 5,825,283, System for the Security and Auditing of Persons and Property, discloses a vehicle and personnel tracking system and geofence applications but does not mention shipping containers or the locking of such. Radican, in U.S. Pat. No. 6,148, 291, Container Inventory Monitoring Methods and Systems, discloses an inventory system for shipping containers but does not mention security or the locking of such containers. Carson, in U.S. Pat. No. 6,577,921, Container Tracking System, discloses localized tracking within storage and transfer yards without mention of security or the locking of such containers. Ghaffari, in U.S. Pat. No. 6,662,068, Real Time Total Asset Visibility System, discloses a tracking system for cargo but does not mention shipping containers, or security or locking of such containers. Lareau, in U.S. Pat. No. 6,972,682, Monitoring and Tracking of Assets by Utilizing Wireless Communications, discloses wireless tracking and triangulation of container location but does not mention security or locking of shipping containers. Shafer, in U.S. Pat. No. 7,165,722, Method and System for Communicating with Identification Tags discloses IP addressing of RFID tags without mention of securing or locking of such containers. Twitchell, in U.S. Pat. No. 7,221,668, Communications within Population of Wireless Transceivers Based on Common Designation, discloses the ad hoc network formation within shipping containers to provide location and condition without mention of container security or locking. Neher, in U.S. Pat. No. 7,242,322, Security Tracker, discloses a covert tracking system for monitoring location and condition for later download, without mention of security or locking of the container.

OBJECTS AND ADVANTAGES

Objects of the present invention include the following: providing a secure locking device for cargo containers that simultaneously monitors at least one condition affecting the container; providing a combined container lock and container monitor capable of transmitting monitored data to a central administrator; providing a locking device for cargo containers that simultaneously monitors a condition of the container and the container's location within a GPS system; providing a locking, monitoring, and display device for cargo containers that is capable of displaying selected messages on an outside surface of the container; providing a locking device for cargo containers that can display messages received from a remote system administrator; and, providing a locking device for cargo containers that can display selected messages when the container is in selected geographic locations. These and other objects and advantages of the invention will become apparent from consideration of the following specification, read in conjunction with the drawings.

SUMMARY OF THE INVENTION

According to one aspect of the invention, a security system for freight containers comprises: a locking device configured to reliably attach to the container and prevent unauthorized opening of the container doors; a sensing device configured to sense at least one condition affecting the container; and, a communication system configured to transmit the output of the sensing device to a system monitor located remotely from the container.

According to another aspect of the invention, a security system for freight containers comprises: a locking device configured to reliably attach to the container and prevent unauthorized opening of the container doors; a sensing device including a two-way communication system, the sensing device configured to sense at least one condition affecting the container, the sensing device further containing a GPS receiver; and, a system monitor located remotely from the container, the system monitor configured to receive data from the sensing device at selected times and to communicate with the sensing device at selected times.

According to another aspect of the invention, a security system for freight containers comprises: a locking device configured to reliably attach to the container and prevent unauthorized opening of the container doors; a sensing device configured to sense at least one condition affecting the container; a communication system configured to transmit the output of the sensing device to a system monitor located remotely from the container; a visual display device on the outside of the container, capable of displaying selected information; and, a system monitor configured to receive selected data from the sensing device and to transmit selected messages to the visual display device.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

The invention combines an access bar for a shipping container with a variety of wireless communications technologies (including, but not limited to: Radio Frequency Identification, cellular communications, and satellite communications) and a sensor interface to allow the detection of selected events or environmental factors (including but not limited to: tilting, vibration, and tamper switches, air pressure, temperature and humidity sensors, and detectors for hazardous conditions such as the presence of chemical, biological, radiological, nuclear, and explosive agents). It further incorporates a geographically-based lock that prevents unauthorized opening of the container until the container has reached a selected destination, as described more fully in Applicants' co-pending application.

In the examples that follow, it will become apparent that a trackable, removable, and secure device to secure both doors simultaneously provides a unique solution to many of the known concerns of the intermodal shipping industry. Some of the noteworthy benefits include: 1. Only one device is required to secure both the doors. 2. Tracking the lock is a convenient proxy for tracking the container. 3. The inventive device is reusable by shipper or carrier and because it is a small, high-value component (compared to the empty container) it is more convenient to store when not in use than a similar component integrated permanently onto a container. 4. It does not interrupt the normal flow of cargo or impede legitimate access to the cargo. 5. It allows access to be granted according to a selected hierarchy of communications and information.

EXAMPLE

Figure 1:
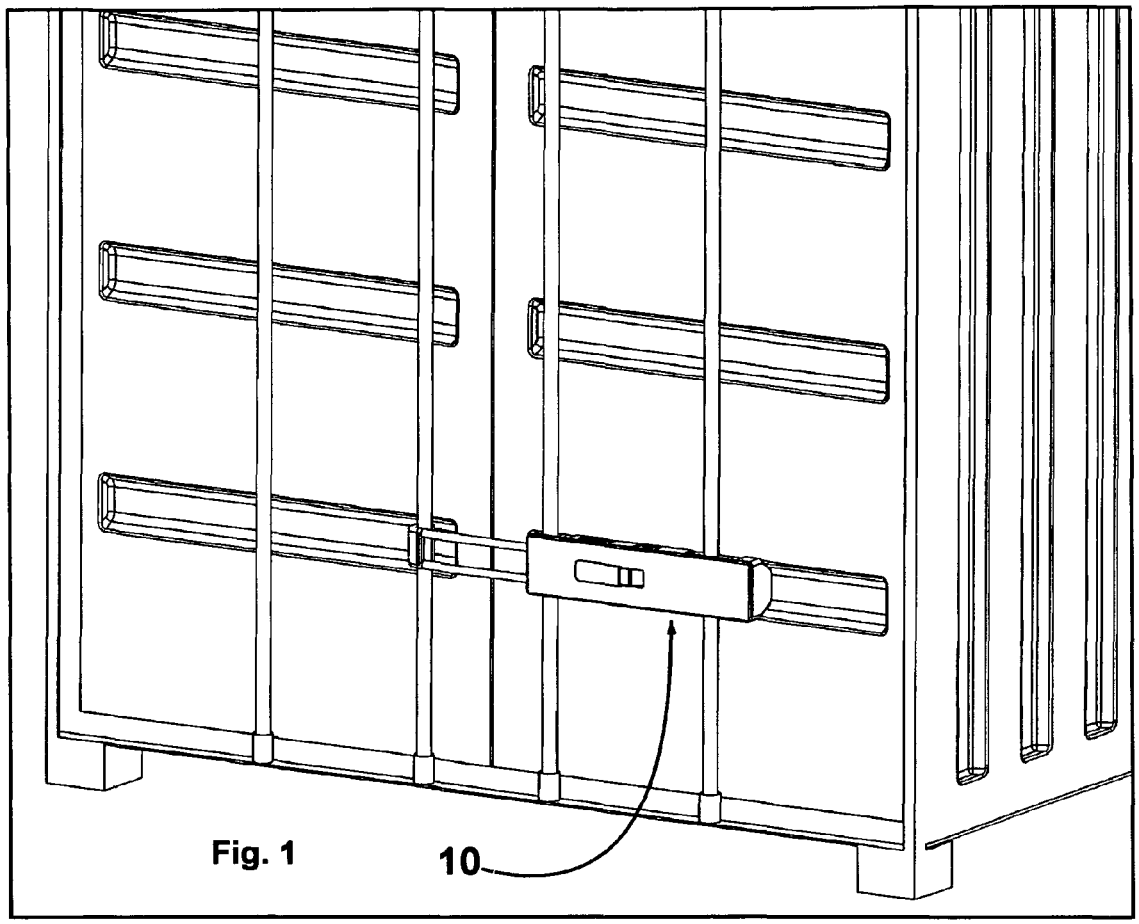
FIG. 1 is a schematic illustration of one embodiment of the invention, in which a locking assembly or Access Bar is deployed on a shipping container to secure the doors.
Figure 2:
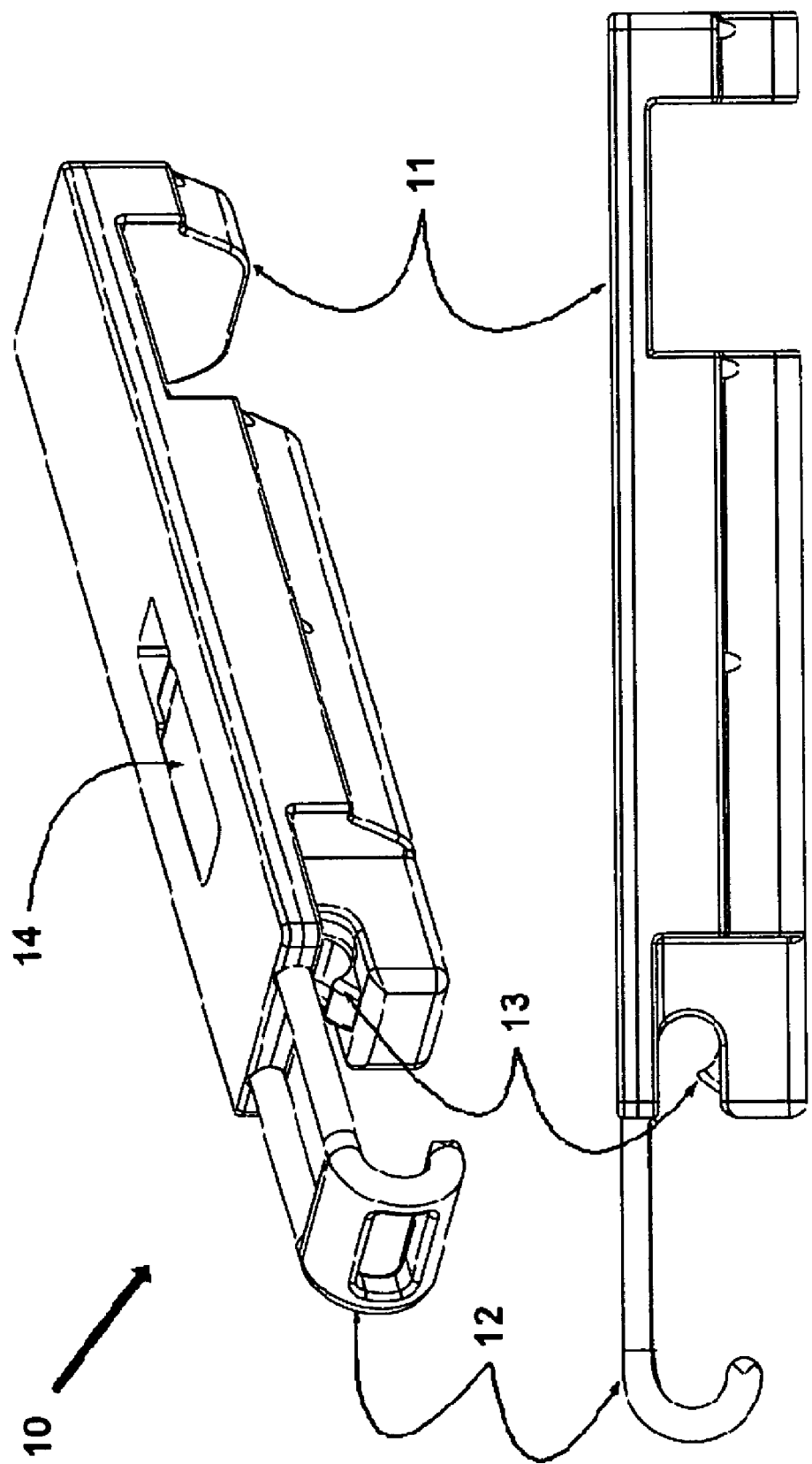
FIG. 2 is a schematic illustration of one embodiment of the invention, separated from the shipping container.

Applicants' co-pending application describes a removable Access Bar configured to securely lock a shipping container, as shown generally in FIGS. 1 and 2. Applicants contemplate that in many applications, the Access Bar will be configured with a form factor that is compatible with certain characteristic dimensions of standard shipping containers, as shown in the figures. It can be seen that in the embodiment shown in the drawings, the Access Bar may take advantage of depressions in the doors so that much of the electronics may be afforded somewhat more protection while at the same time the Access Bar lies flat against the container and thus minimizes protrusions or other deviations from normal container dimensions that might interfere with automated container handling. Although not shown in the drawings, it will be appreciated that the inventive concept may equally well be adapted to containers of other geometries with only routine engineering modifications. For example, the Access bar may be configured with a ring-like locking mechanism to grasp the rim of a standard drum or barrel, thereby preventing the barrel from being opened during transit.

EXAMPLE

Figure 3A:
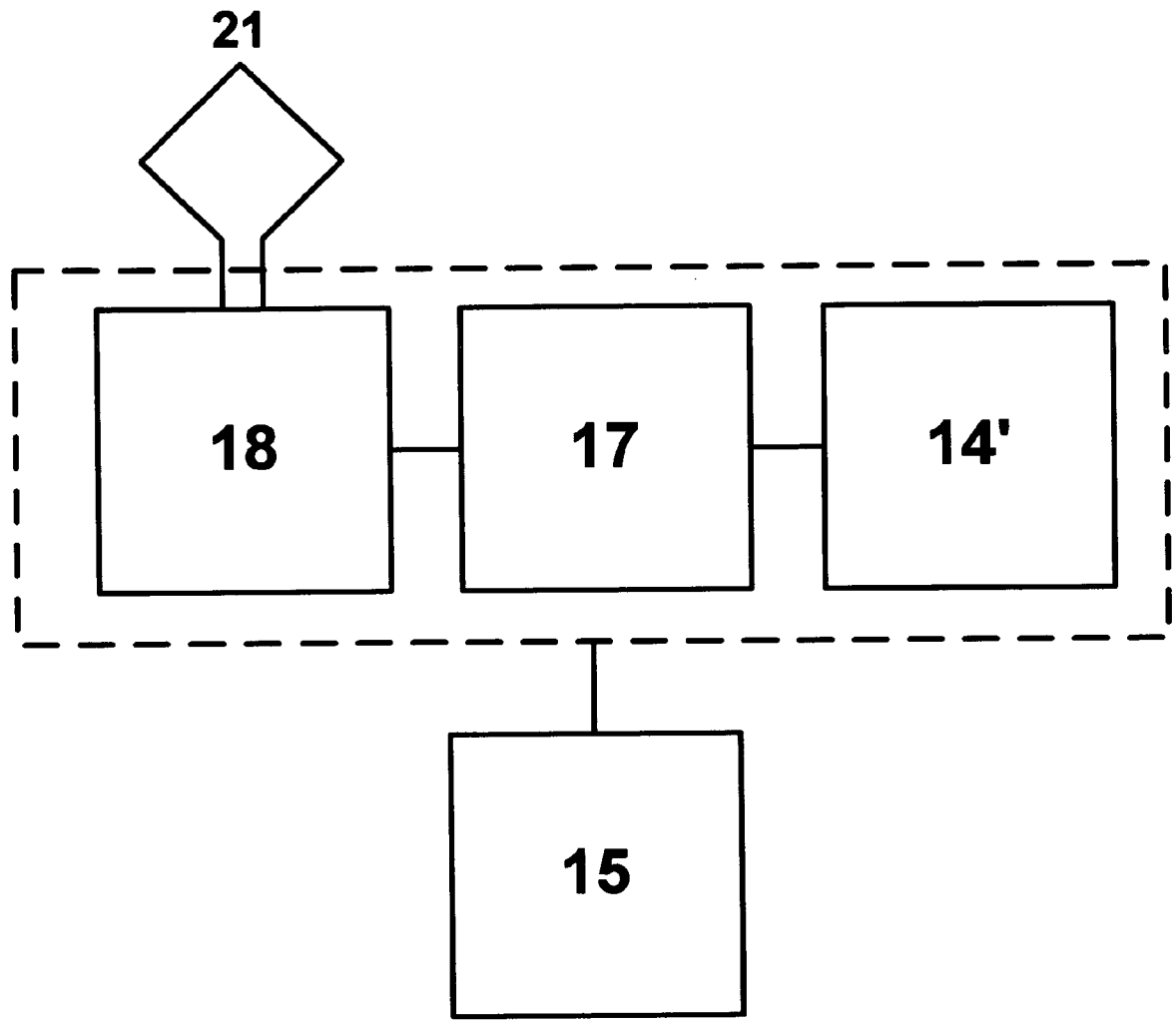
FIG. 3A illustrates a block diagram of the functional components in an Access Bar according to one aspect of the present invention.
Figure 3B:
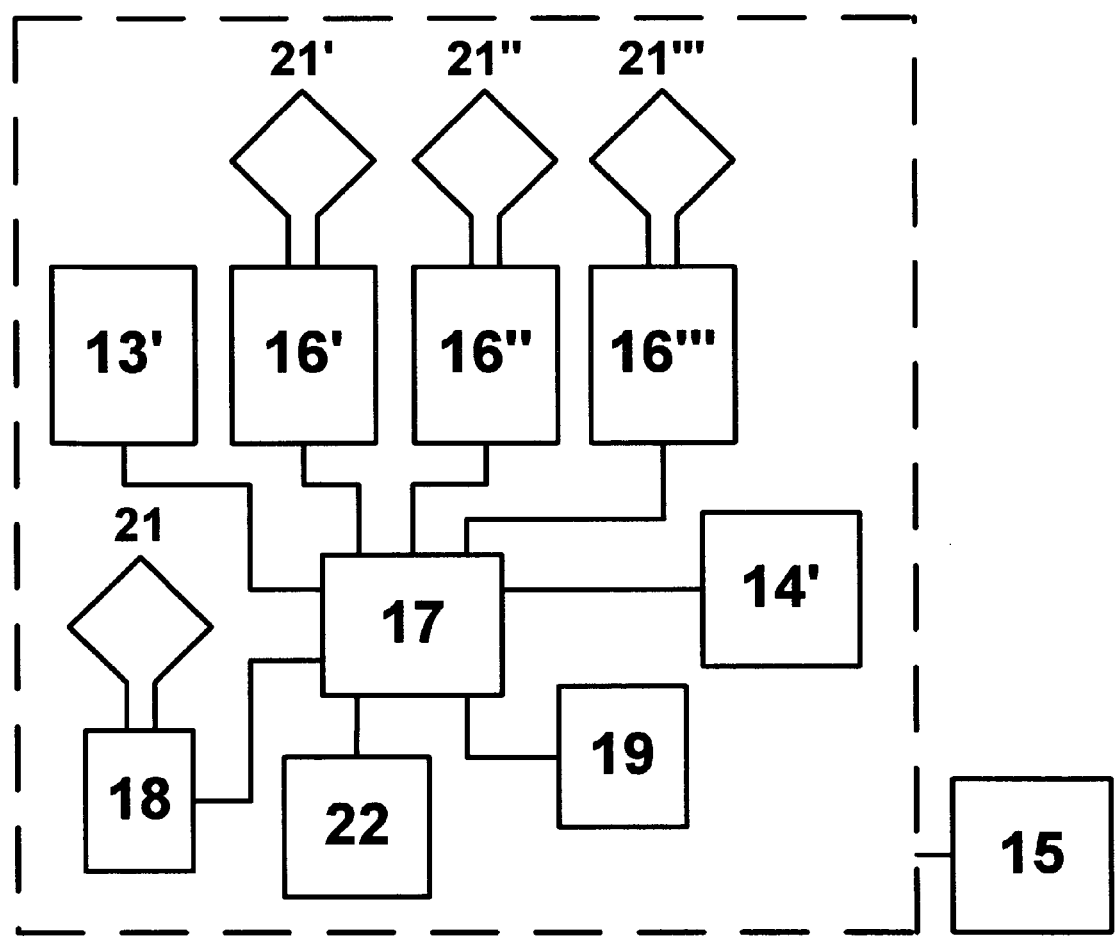
FIG. 3B illustrates a block diagram of the functional components in an Access Bar according to another aspect of the present invention.

As shown generally in FIG. 3A, the Access Bar 10 contains, among other things, a GPS circuit 18 that operates to prevent the Access Bar from being unlocked before the container has reached a selected destination. The Access Bar 10 optionally includes the provision of at least the following: one or more selected sensor packages 19; one or more wireless communication systems 16 that may include Radio Frequency Identification, data radios, cellular, and satellite communications. A suitable antenna 21 is preferably disposed integrally with the device to minimize protrusions and protect the system from mechanical damage. Additional RFID components may be located on the side of the device.

EXAMPLE

Although some elements of the device (notably RFID tags) may be substantially passive devices, it is contemplated that in many applications it will be preferable to have an on-board power supply 15. This may be accomplished with batteries, fuel cells, and the like, and provision may also be made for recharging or maintaining charge via a cradle or an umbilical configured to accept power from a shipboard generator during ocean transit, for example.

EXAMPLE

The sensor package 19 may include a number of devices performing various security and tracking functions. The device may allow for wireless communication with a variety of sensor (chemical, biological, radiological, nuclear, explosive, temperature, humidity, vibration, accelerometry, etc.) and information sources (camera, keypad, PDA, cell phone, satellite phone, hand-held interrogator, RFID reader, etc.). Sensor package 19 may contain a load cell, strain gage, or other means of monitoring tension on locking bar 12 so that an alarm condition will be triggered if bar 12 is cut or even if the bars on the container door are cut. The device will communicate wirelessly with a sensor node, which detects a variety of constituents and conditions, either permanently or temporarily installed in an intermodal container, over the road trailer, or enclosed conveyance.

It will be appreciated that wireless communication may include such familiar protocols as serial radio, cellular radio, satellite radio, etc. The wireless device(s) will preferably be utilized in order of cost of communications beginning with the serial radio, which, with the Reader within range, represents the least cost. Failing to identify a valid serial radio link, the cellular radio may be activated. Failing to identify a valid cellular link, satellite communication to one of multiple low earth orbit satellite systems may be activated. This process optimizes the cost of data communications on a global basis.

EXAMPLE

As noted above, the inventive Access Bar may contain various sensing elements such as chemical, biological, or radiation sensors, or it may be in wireless communication with sensors deployed elsewhere in or on the container. Such sensors may be used to alert the shipper that unauthorized materials have been packed in the container. It will be appreciated, however, that a modern container ship might carry as many as 6000 containers. Thus, the Access Bar may detect a source of radiation in an adjacent container and serve as a warning that hazardous material is present somewhere else on the ship. If a source of radioactivity were somewhere on board, it is possible that data from perhaps a dozen widely distributed sensors could be triangulated and the resulting data used to alert authorities before the ship arrived at port, and even give an indication of the approximate location of the suspicious container before the ship is unloaded or even close to populated areas.

The foregoing example illustrates an important aspect of the invention, viz., that the system administrator, by having access to reports from a plurality of Access Bars, inherently derives a higher level of situational awareness, and that the resulting information can therefore have significant added value to various clients.

It will further be appreciated that the general level of background radiation varies from place to place around the earth. Because the invention includes GPS location data, corrections can be made for fluctuations in background that are due to known local geophysical effects. Further, by having a plurality of Access Bars in a given geographical area, the background radiation can be identified through mathematical averaging and either reported to the system administrator or used to analyze local radiological patterns to determine threats.

EXAMPLE

The Access Bar may be provided with one or more components 22 for local data input/output. A ruggedized keypad may be used to enter certain functions and commands, such as arm/disarm, lock/unlock, etc. Alternatively, for entering more detailed information, such as a shipping manifest, a USB port or other standard data bus such as a Bluetooth wireless link may be provided.

EXAMPLE

In one embodiment, the device uses two electronically controlled mechanical devices: one mechanism 13 holds the device to one of the container doors (install/uninstall), and the other mechanism 12 locks the container doors closed (lock/unlock) by means of a mechanical latch 14 that may be secured in the locked position by an internally mounted electromechanical latch. Each device 12, 13 can be engaged or disengaged separately based on rectangular geofences. The install/uninstall geofences are defined and evaluated locally by the invention, and the lock/unlock geofences are defined and evaluated remotely by the server based tracking system. The install/uninstall mechanism 13 can also be engaged or disengaged for unscheduled inspections by a single use code either sent from the tracking and system or entered through a ruggedized keypad or other I/O device 22 on the exterior of Access Bar 10.

EXAMPLE

In general, Applicants contemplate that the locking bar 12 has a series of teeth that engage a ratcheting mechanism, and in the unlocked condition bar 12 may be free to slide completely out of the device. Those skilled in the art will appreciate that this configuration lends itself to being implemented as a somewhat smaller device that can operate like a padlock and thereby secure any closure that is designed to have a bolt-type lock.

EXAMPLE

In its simplest form, the geolock comprises the following components, as shown schematically in FIG. 3A: an electromechanical lock actuator or latching mechanism 14', a GPS receiver 18 including a suitable antenna 21, a CPU or other logic device configured to allow the operation of lock actuator 14' when certain GPS location requirements are satisfied, and a power supply 15 capable of providing sufficient power to operate all components for a suitable period of time.

EXAMPLE

As noted above, a key element of the inventive Access Bar is a "geolock" that is designed to allow the lock to be opened only if some geographic condition is met (typically indicating that the container has reached a selected destination). Applicants contemplate that under normal operating conditions, the geolock will be governed primarily by GPS data. Applicants recognize, however, that means are available to spoof a GPS receiver if an adversary has sufficient resources and is able to position sophisticated RF equipment close enough to the GPS unit. The inventive Access Bar may therefore be optionally equipped with redundant means of cross-checking the GPS data. Some preferred means include the following:

1. Small accelerometers may be used along with a clock to compute the approximate location by dead reckoning; if the GPS location differs from the dead reckoning location by some selected margin of error, the lock will not open without additional authorization. Accelerometers may be incorporated in sensor package 19.

2. A clock circuit may be used to prevent unlocking at any time prior to the approximate scheduled time of arrival, in a manner analogous to a lock on a bank vault that prevents it from being unlocked at night even if one has the combination.

3. The system administrator (or the internal memory in the Access Bar itself) may receive periodic updates on the container's location. If the indicated location is greatly different from the previously updated location, in such a way as to suggest a physically impossible movement, an alarm condition may be indicated and the lock will not be opened.

4. An access code may be required in addition to satisfying the GPS location required by the geolock.

5. It is contemplated that several (or many) containers on a given ship (or train) may be equipped with the inventive Access Bar. The system administrator may therefore be alerted if the indicated GPS location of one container abruptly differs from that of other containers that are supposed to be traveling together.

Some examples of commercial available wireless communications modules include the following: 1. Serial Mesh Radio (e.g., ZMN2405HP manufactured by RF Monolithics, Inc. 4441 Sigma Road, Dallas, Tex. 75244), 2. Quadband GSM Cellular (e.g., GM862-GPS manufactured by Telit Wireless Solutions, Inc. 3131 RDU Center Drive, Suite 135, Morrisville, N.C. 27560), 3. LEO Satellite (e.g., DS100 manufactured by Stellar Satellite Communications Ltd., 46050 Manekin Plaza, Suite 100, Dulles Va. 20166). All of the foregoing are suitable in for inclusion in the inventive device in terms of form factor, data conditioning, and power conditioning characteristics.

Some examples of commercial available sensor packages include the following: 1. Angular rate sensors and gyroscopes, (e.g., ADXRS manufactured by Analog Devices, 3 Technology Way, Norwood, Mass. 02062), 2. Pressure sensors (e.g., Flexiforce manufactured by Tekscan, Inc., 307 West First Street, South Boston, Mass. 02127-1309), 3. Magnetometers (e.g., MicroMag manufactured by PNI Sensor Corporation, 133 Aviation Blvd., Suite 101, Santa Rosa, Calif. 95403), 4. Accelerometry (e.g., ADXL manufactured by Analog Devices, 3 Technology Way, Norwood, Mass. 02062). Other sensors such as temperature and humidity sensors, tamper switches, etc. are well known in the art. All of the foregoing are likewise suitable in for inclusion in the inventive device in terms of form factor, data conditioning, antenna configuration, and power conditioning characteristics. Systems known in the art to detect and measure chemical, biological radiological, nuclear, and explosive agents are also suitable for inclusion in the inventive access bar.

There are many suitable commercially available central processing units and microcontrollers; for example, Applicants have found the following device to be suitable for carrying out the invention: ARM9, manufactured by ARM Ltd., 110 Fulbourn Road, Cambridge, UK. This and many similar devices are all suitable for inclusion in the inventive device in terms of form factor, data conditioning, and power conditioning characteristics.

EXAMPLE

The inventive Access Bar may further be adapted to a less-than-load tracking application via the wireless serial mesh radio. Individual cargo constituents in the container (individual packages, individual pallets, or the like) may be affixed with a compatible serial radio, which may be a meshing radio, in order to report to the Access Bar. The inventive Access Bar can aggregate these devices to provide the ability to perform real-time inventory on a suitably equipped container at any point in its journey.

EXAMPLE

Another aspect of the Access Bar is to serve as a remote aggregation point for terminals, yards, depots, warehouses, and the like. The aggregation point includes a combination of a serial mesh radio and a satellite uplink or direct access to the internet in order to transmit information on the status, condition, and location of the Access Bar. The remote uplink can aggregate these devices to provide the ability to perform real-time inventory of the containers in any geographic location.

EXAMPLE

Another important aspect of the inventive method is a network operation center 44 including a system administration with automated and/or manual systems for aggregating Access Bar information, distributing client information, and performing advanced value-added logistics and risk or threat analysis. As noted above, those skilled in the art will appreciate that this system provides a higher level of situational awareness and a common operational picture from the container, to the community, to the region, to the world. This situational awareness not only improves the overall logistics operation, but also can provide key elements of an early warning security system for a variety of chemical, biological, radiological, nuclear, and explosive threats.

EXAMPLE

The locking bar 12 may be manufactured by various conventional methods, provided that the resulting structure has adequate strength both to withstand normal stresses in service and to provide adequate resistance to tampering or intrusion attempts. The bar is preferably metal, such as stamped, bent, and machined/punched steel, extruded aluminum, titanium, or other suitable structural alloy. It may further be provided with selected coatings such as chrome plating, polymer dips, paints, diamond films, etc. for corrosion resistance and may be heat treated to harden it against cutting or sawing. Decorative paints, decals, etc. may be provided to the protective housing 11 identify the owner of the device or for branding, advertising, or other desired purposes. Housing 11 may be constructed of any suitable material having adequate strength; in many cases it will be cast, stamped, deep drawn, machined, or formed metal, metal alloy, or metal-matrix composite. Alternatively, it may be a polymer- or ceramic-matrix composite. Depending on the dielectric properties of housing 11 RF-transparent windows or antenna feedthroughs as are well known in the art may be provided in order to allow one- or two-way communication signals to enter or exit housing 11.

In addition to the particular exemplary, and therefore non-limiting, configurations shown in the drawings, it will be appreciated that the invention may also be advantageously implemented with gravity-type locking systems such as that generally disclosed by Asher in U.S. Pat. No. 6,364,584.

In addition to the passive display of logos or other advertising as described above, the inventive device may further be provided with visual display means, whereby messages may be displayed to passersby or trailing vehicles. It will be appreciated that the device has several characteristics that make it especially useful for dynamic advertising, viz., it has the capability of communicating with a system administrator, and its geographic position is known. Thus, the system administrator may interact with the device to cause it to display particular messages or advertisements in particular locations, whereby the value of such advertising may be maximized. Alternatively, the visual display means may be used to alert workers at the point of arrival that the container has experienced some off-normal condition as well as to provide visual confirmation that the system is working normally.

EXAMPLE

Figure 6:
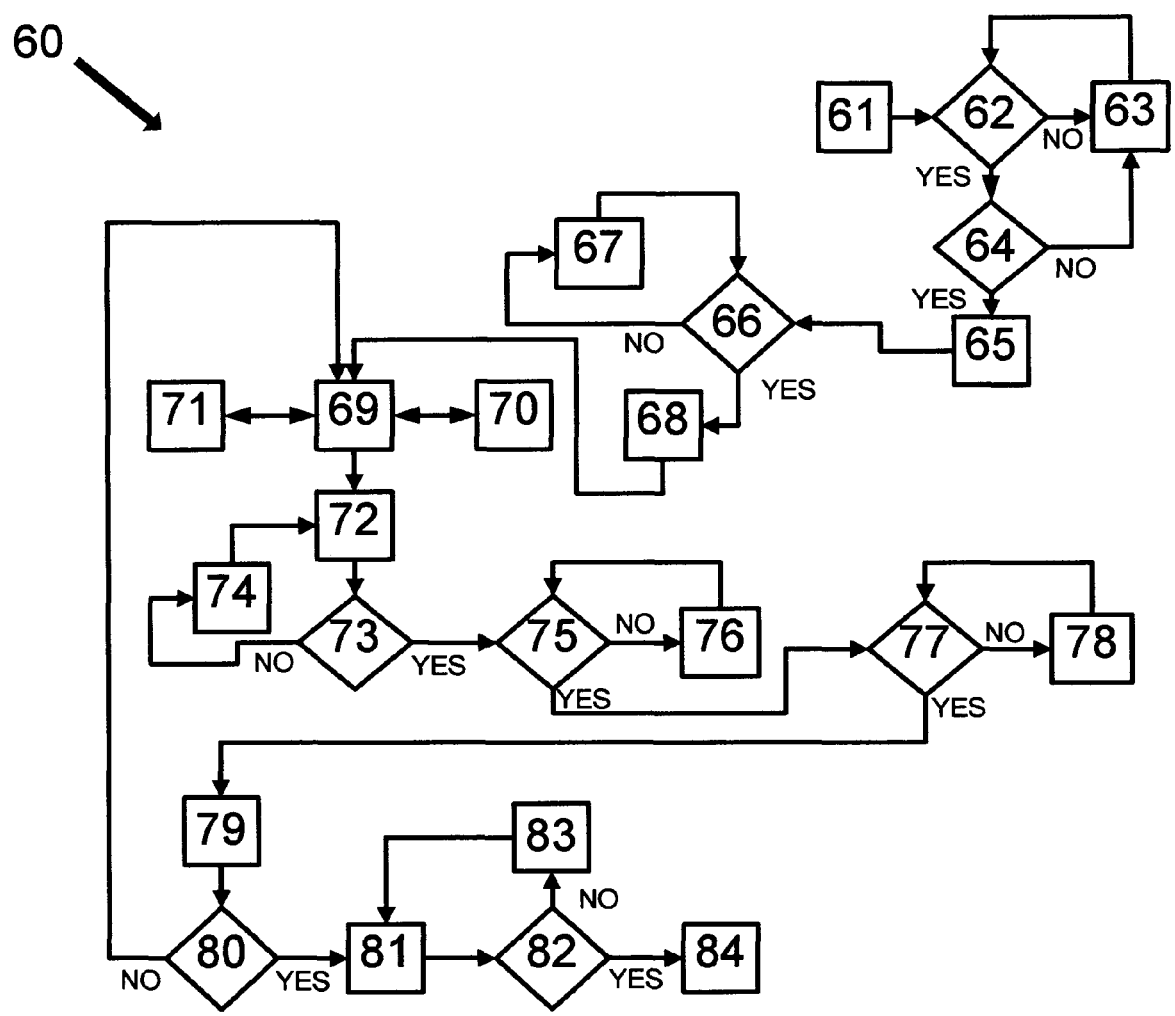
FIG. 6 illustrates a method for securing cargo in accordance with another aspect of the invention.

One aspect of the inventive method is shown generally at 50 in FIG. 6, wherein the individual operations are:
51 Load container
52 Install Access Bar 10 on first door
53 Install locking bar 12 on second door and tension locking bar using latch mechanism 14
54 Monitor status and location en route, preferably via GPS 18
55 Communicate with system administrator/server
55A Report to server at selected intervals
55B Report to server on alarms, warnings, or deviations
55C Receive acknowledgments/updates/authorizations from server
56 Arrive at waypoint
57 Unlock based on time, location, and/or access code
58 Last waypoint?
59 Uninstall based on time, location, and/or access code.

EXAMPLE

Another aspect of the inventive method is shown generally at 60 in FIG. 6, wherein the individual operations are:
61 Itinerary programmed; alarm on disparity with geography/schedule
62 At startpoint?
63 Maintain unlatched/unlocked status
64 Properly installed?
65 Report status to server
66 Properly locked?
67 Report status to server
68 Report status to server
69 Run "itinerary"
70 Report to server on alarms, warnings, or deviations
71 Receive acknowledgments/updates from server
72 Wait for keypad input
73 Valid code?
74 Report event to server
75 Valid location for code?
76 Report event to server
77 Valid time for location and code?
78 Report event to server
79 Unlock
80 End of itinerary?
81 Wait for keypad input
82 Valid code?
83 Report event to server
84 Unlatch (uninstall) and sleep The foregoing example illustrates some ways in which the invention provides redundant validation to GPS data to prevent unauthorized opening if the GPS is tampered with or spoofed electronically.

EXAMPLE

The general method of using the invention according to one aspect of the invention may be described as follows: The Access Bar with its on-board electronics package is attached to the container at some point in the supply chain, which is preferably the point of its packing. The on-board package notes the installation, reports Global Positioning Systems (GPS) location, time stamp, and condition of any sensors. The system remains in place (relative to the container) for the length of the intermodal journey. If, during the trip, a variety of sensor conditions occurs, the mechanism may either report through the wireless medium of choice an alert condition, or it may simply record the condition in on-board memory for later downloading at the time of arrival. Reportable sensor conditions may include low battery, tampering, removal, temperature out of range, humidity out of range, or the presence of chemical, biological, radiological, nuclear, or explosives of interest. The device may further report to the system administrator on request or upon a predetermined time interval through the wireless medium of choice. Reports may include such parameters as GPS coordinates, battery condition, switch positions, and readings from sensors configured to respond to temperature, humidity, or chemical, biological, radiological, nuclear, and explosive agents, etc. The device may be programmed to report certain conditions immediately to the system administrator, such as large deviations in GPS coordinates or the presence of radioactivity, whereas other, less critical sensor conditions such as tip/tilt or impact/acceleration readings may be reported at the time of arrival so that the cargo can be immediately inspected for damage.

The inventive system may exploit so-called ad-hoc wireless networking (serial mesh radio). Some characteristics of Ad Hoc Serial Network Radio include: 1. Secure hand-shaking using a variety of information security, encryption, and validation protocols; 2. Scalable to Hybridized Spread Spectrum (HSS) radio format; 3. Automatically finds other related devices within range; 4. Automatically forms communities if two or more related devices are present; 5. "Elects" a spokesman to collect and send Tracking and Security Information (TSI) for whole community based on the minimum period settings of each individual of the community

EXAMPLE

The invention may further use a protocol that is an anti "spoofing" system for Intelligent RFID Tags that prevents malicious attacks from interfering with the normal operation of the invention. The protocol makes use of an on-board circuit to generate a universally unique identification code based on the collected history, geography, and condition of the device. This code becomes part of the distributed intelligence provided by the inventive solution.

Those skilled in the art will appreciate that the inventive system provides a removable, but secure platform for intermodal assets. The modular nature combines tracking, sensing, and security in an interchangeable/mix-and-match building block architecture in which particular users may select the sensor package of interest, the identification and reporting protocols to be used, and the communication methods that are most suitable to the user and asset being shipped.

The inventive system is contemplated to be used within a global intermodal transportation management system consisting of facilities for the capture, storage, retrieval, analysis, and action (alerts, alarms, etc.) of geographic location and condition information in a web-ready/web-friendly data visualization and reporting application. As such, it forms a fully enabled Geographic Information System (GIS) with customized industry specific applications build around the GIS core/platform. A web-based tracking service may provide real-time access to asset location and condition, automated customized alerts, and content for client needs accessible from any internet-enabled terminal globally. Logistics information can be pulled or pushed directly from the site into the user's internal resource management system. The inventive system may be further enhanced with custom, value-added client services to augment the functionality of the basic tracking system.

Figure 4:
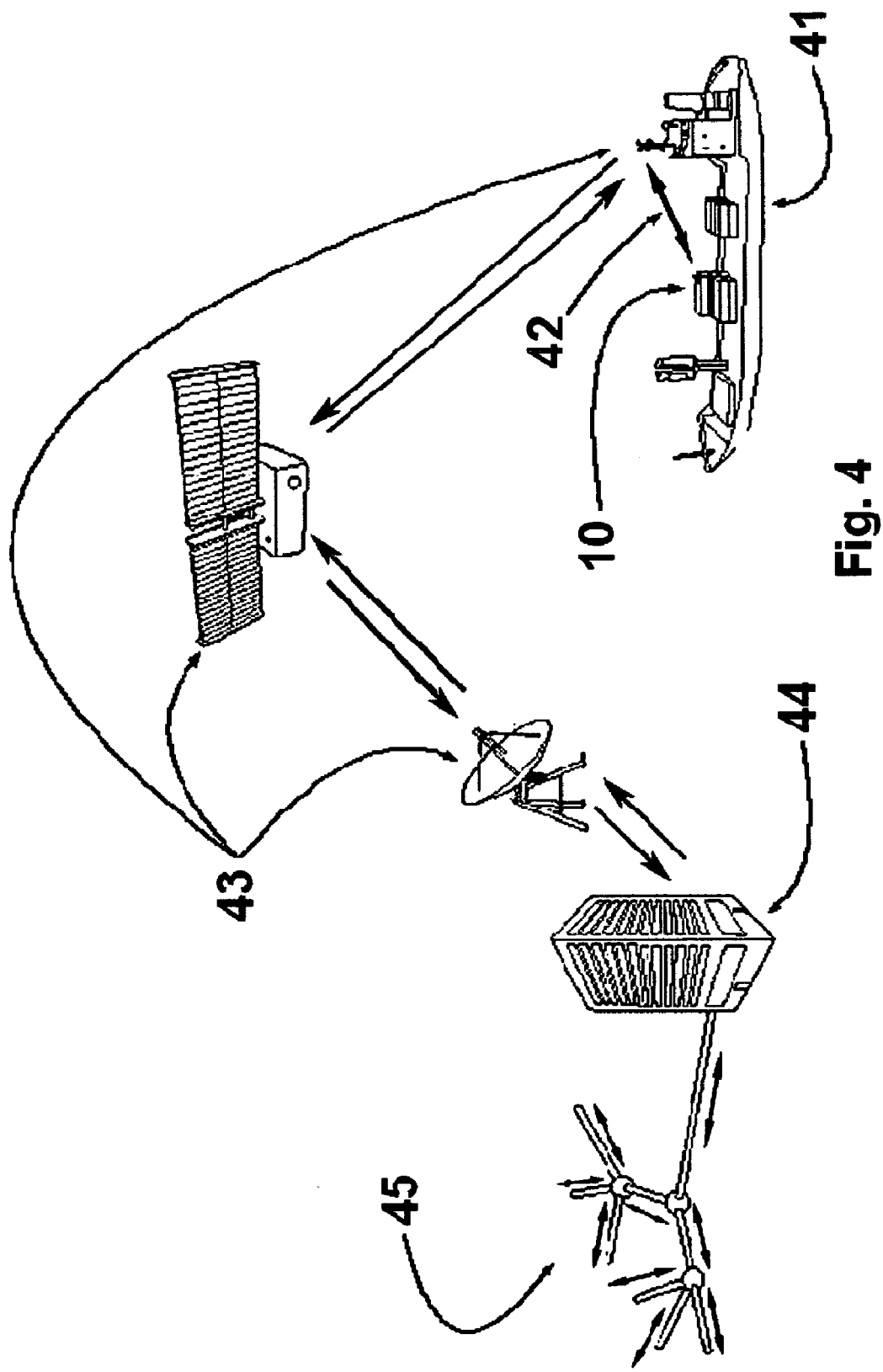
FIG. 4 illustrates several aspects of local and global communications according to one aspect of the invention.
Figure 5:
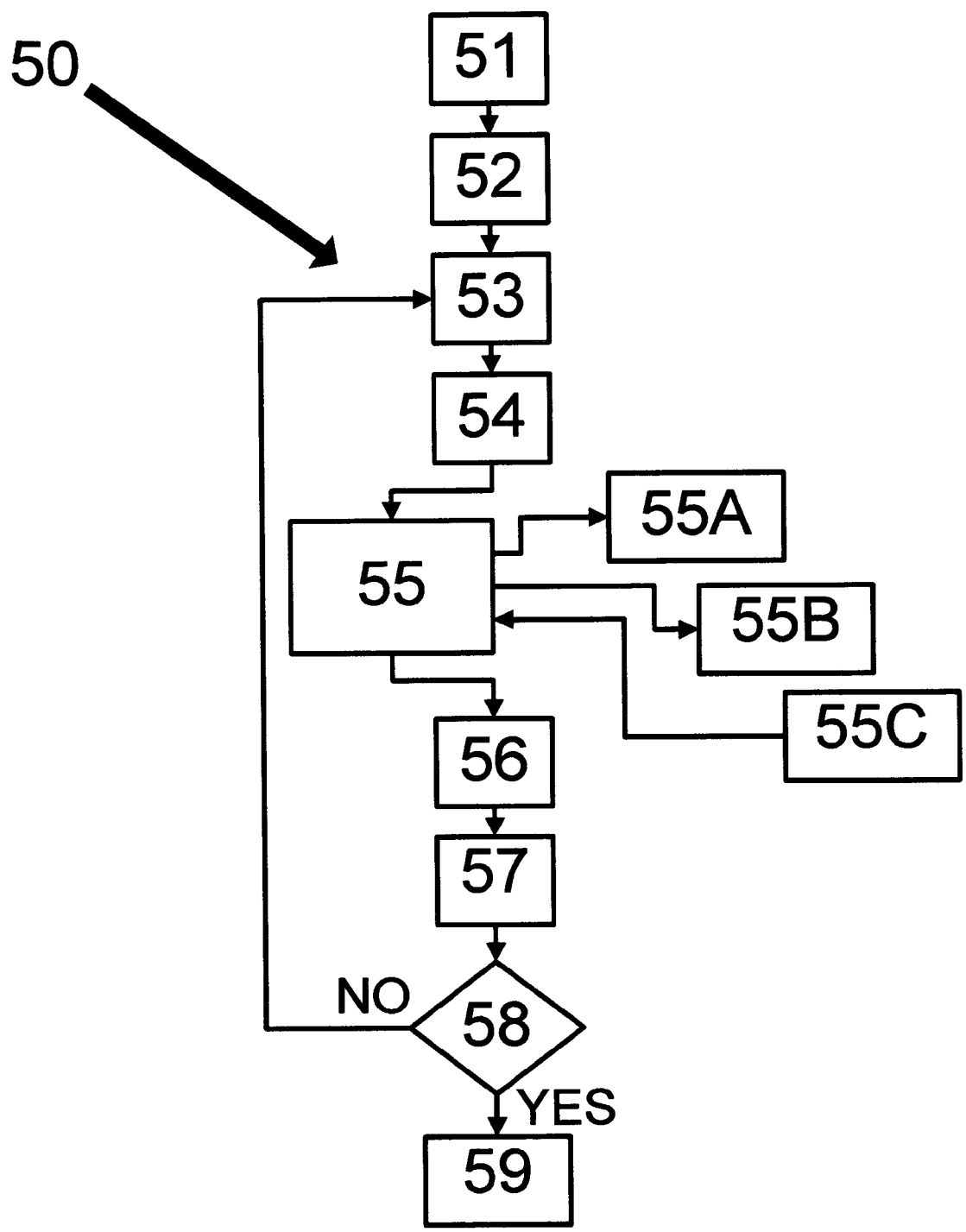
FIG. 5 illustrates a method for securing cargo in accordance with one aspect of the invention.

The general characteristics of the inventive method as applied to marine transportation is illustrated schematically in FIG. 4.

EXAMPLE

Some aspects of the communication links that may be employed in the inventive method are shown schematically in FIG. 4. A container ship 41 carries a plurality of containers, at least one of which is fitted with the inventive Access Bar 10. Local communication 42 may be established with a transceiver on board ship 41. Satellite communications 43 carry data between ship 41 and the system administrator 44. The system administrator may in turn forward selected data reports to one or more clients indicated generally at 45. The clients 45 may include the shipper or owner of the cargo; the shipping line or ship owner; and various government agencies.

The inventive system is designed to address the following critical attributes of a global asset tracking and control solution in the following ways:

The system includes the following components: 1. Rigid ISO compliant container locking devices—a physical locking system using the inherent characteristics of the container to protect the container from violation. 2. Robust active RFID technology—assets must be visible under extremely harsh wireless multipath interference conditions (e.g. local area networking of container-based and sub-container assets in stacks in a port, on a ship's deck, in the hold of a ship, and in warehouses). 3. Satellite and/or cellular communications—the ability to utilize wide area communication networks in remote areas to validate security and fulfill logistics optimization operational needs. 4. Smart Sensor networks—"plug and play" smart sensors with a universal addressing scheme to determine the integrity and condition of containers and cargo. 5. Intelligent information systems—capable of analyzing geostatistical and geospatial information and patterns (e.g. Geographic Information Systems) to create Strategic Asset Intelligence. 6. Advanced battery technology—battery life exceeding three years.

The preferred capabilities of the inventive system include the following: 1. Secure wireless communications system—the information transmitted via wireless and wired networks must be protected to prevent eavesdropping (e.g. physical layer security, data scrambling, encryption, authentication, etc.). 2. Real-time location—GPS, advanced television signal processing, dead reckoning, or other location based technologies providing the ability to pinpoint assets in real-time under harsh multipath conditions represents a substantial increase in efficiency for port, ship, and warehouse management justifying rapid return on investment. 3. Intelligence fusion—a Common Operational Picture (COP) with real-time alert capability. 4. Network security—multi-layer security scheme for asset tracking and analysis. 5. Multi-user access scheme—wireless devices must have the ability to communicate simultaneously with large numbers of tags per reader (>5000) in a given area to accommodate the numbers of containers in close proximity in modern shipping terminals. 6. Globally available unlicensed radio frequency—need for a single unlicensed RF band to insure interoperability in local area networking and RFID applications or frequency and protocol agile RFID systems.

It will be appreciated that the system relies on wireless communications in various ways. There are three basic approaches to robust wireless RFID communications under harsh multipath environments, viz., Peer-to-peer (mesh networking) solutions, Ultra Wideband solutions; and, Hybridized Spread Spectrum solutions. Applicants prefer the Hybridized Spread Spectrum (HSS) solution because it best stands to holistically address the performance specifications of a global asset tracking and control system: The HSS approach allows for a narrow-spectrum, broad band solution to be engineered to, e.g., a 2.45 GHz frequency (high data rates and higher resistance to environmental conditions), which is the only emerging globally available unlicensed band at the moment providing for robust wireless communications under harsh multipath interference conditions, the traditional barrier to wireless communications. The state-of-the-art in HSS technology constitutes a superior anti-collision wireless communications solution based on the utilization of time sequencing (increased volume for multi-user access), fast frequency hopping (superior resistance to multipath interference), and direct sequence spread spectrum (superior resistance to interference from and two other RF applications in the same geographic area) protocols combined in a unique way and incorporating advanced signal processing concepts.

In essence, the HSS system is able to distinguish the original signal from short-range multipath reflections. The statistical probability of successful communication on the first attempt is 99.99 percent at the bit level with the HSS approach. This network reliability level reduces the need for redundant transmission thereby increasing battery life over currently available commercial technologies. Based on the narrow band solution that is virtually immune to multipath interference, the system will support radiolocation (1 meter 3 dimensional accuracy in real-time) to be performed on individual tags in the standard stacking conditions of shipping containers in a port, on a ship, in the hold of a ship, and in warehouses. The HSS solution can create a geo-optimized mesh networking capability intelligently switching modes depending on the nature of the environment based on the radiolocation and transceiver architecture (each tag is a reader and a transmitter). The time sequencing aspects of the HSS solution has the potential to support two-way communication with up to 10,000 individual tags per Reader unit in every 100-second window, which is critical in the maritime ship and port environment. The end result is a robust multi-user active RFID wireless tracking and communication solution with inherent security at the physical layer (based on the way the waveform is generated) upon which encryption, data scrambling, and authentication security can be layered. For these reasons, the HSS approach appears to be the most logical and tenable solution to a globally deployed RFID total asset visibility solution.

In studies conducted in February, 2004, the HSS solution was first demonstrated at the Port of Charleston, Wando Terminal at the APM Terminals North American facility and again in June of 2004 for the Department of Homeland Security, Homeland Security Advanced Research Projects Agency. The HSS technology proved the ability to communicate from with a standard stack of refrigerated containers in real-time using a 2.45 GHz RFID solution with near-perfect accuracy. Additional testing was completed in August of 2004 demonstrating the ability to communicate under standard stacking conditions (10 long×3 high) of "dry box" shipping containers.

The inventive system provides real-time asset tracking for both commercial intermodal asset management and homeland security needs: 1. Real-time, global ship location tracking with detailed history of passage to provide a comprehensive "view" of all maritime shipping vessels. 2. Remote aggregation and uplink point for depots, terminals, yards, etc., which is a combination of a remote satellite uplink and a serial mesh radio. 3. Track container location and condition with tampering notification and internal environmental, biological, chemical, and radiation status. 4. Early warning/ threat identification of ships and containers arrival in US waters and ports with an audit trail. 5. Detect and monitor suspicious shipping activities (unscheduled port calls, etc.). 6. Secure data feed to clients and stakeholders on a need-to-know basis. 7. Identify long-term patterns of activity at both container and cargo level. 8. Foster "low risk," fast-track passage protocols through ports, canals, and inspection points. 9. Intermodal inventory management, combining tracking by ship, rail, and truck lines for order management, space allocation, scheduling, load balancing, supply chain management, harbor management, and port/container management.

Satellite and cellular networks provide the Wide Area Network (WAN) ability to track and monitor assets globally in real-time with the ability to concentrate all the information effectively in one location. This provides advantages for security, fault-tolerance, data back-up/archiving, and database maintenance. A central network operations center will integrate a variety of information sources with the transmitted inventive access bar status, location, and condition to support client date needs, advanced value-added commercial logistics, and risk and threat analysis. Both are combined with commercially available technologies in GIS, GPS, real-time alert systems, high performance cluster computing (HPCC), and the Internet in open systems architecture to create a real-time tracking and asset management system. The center provides one single location for real-time logistical support for the global management of mobile assets. The inventive system may further include a web-based tracking system that allows individuals or organizations to manage assets in real-time via the Internet with strict information protection protocols. The information will be distributed to relevant parties through secure transactions on a need-to-know basis thus precluding the use of the system to target assets for theft.

As noted earlier, the Access Bar is small and of generally higher value than an empty shipping container. It is therefore likely that in some applications, it will be desirable to return a number of Access Bars to their original point of origin without necessarily returning the empty containers. It will be appreciated that a metal rack may be constructed that fits into a standard container and has a number of parallel bars spaced comparably to the spacing of the bars on a container door (see, e.g., FIG. 1). A large number of Access Bars may be secured onto the rack and programmed so that they cannot be removed from the rack until they have reached the desired location. The rack in turn holds the Access Bars more securely during transit than if they were simply stacked in an empty container for the voyage.

It will further be appreciated that the invention may usefully be employed in logistical settings other than maritime transportation. Such other settings may include: over-the-road trailers, freight trains, enclosed conveyances of all types, as well as other sizes and constructions of containers used in a variety of industries. Thus, the invention is not limited to use on "standard" maritime shipping containers but may be easily adapted to other sizes and geometries.

We claim:

1. A removable, external security system for freight containers comprising:
   a substantially rigid housing;
   a locking device configured to reliably attach to respective locking bars on both doors of a freight container and prevent unauthorized opening of said container;
   a power supply;
   a sensing device configured to sense at least one condition affecting said container;
   a communication system configured to transmit the output of said sensing device to an external receiver; and,
   a system monitor located remotely from said container, said system monitor configured to receive said output from said sensing device at selected times and provide said output to selected users.

2. The system of claim 1 wherein said substantially rigid housing is constructed from a material selected from the group consisting of: metals and alloys;

metal-matrix composites; ceramic-matrix composites; and polymer-matrix composites.

3. The system of claim 2 wherein at least a portion of said housing is configured to allow RF communications to pass into and out of said housing.

4. The system of claim 1 wherein said locking device comprises a means of monitoring the tension applied by said locking device to said locking bars on said both doors of said container.

5. The system of claim 1 wherein said sensing device is selected from the group consisting of: global positioning system receivers; thermal sensors; chemical sensors; radiation sensors; humidity sensors; air pressure sensors; load cells; accelerometers; tip and tilt sensors; shock sensors; tamper switches; and RFID sensing devices.

6. The system of claim 1 wherein said communication system is configured to communicate wirelessly using a communication mode selected from the following group: serial mesh radio; quadband GSM cellular; and LEO Satellite.

7. The system of claim 1 wherein said system monitor further includes a secure, web-based tracking system configured to allow selected users to manage assets in real-time via the Internet.

8. A removable, external security system for freight containers comprising:
  a locking device configured to reliably attach to respective locking bars on both doors of a freight container and prevent unauthorized opening of the container doors;
  a power supply;
  a sensing device including a two-way communication system, said sensing device further including a GPS receiver and at least one redundant means of cross checking the GPS output; and,
  a system monitor located remotely from said container, said system monitor configured to receive data from said sensing device at selected times and to communicate with said sensing device at selected times.

9. The system of claim 8 wherein said locking device is protected by a substantially rigid housing, wherein at least a portion of said housing is configured to allow RF communications to pass into and out of said housing.

10. The system of claim 8 wherein said redundant means of cross checking said GPS output is selected from the group consisting of:
  using accelerometers and a clock to compute approximate location by dead reckoning;
  using a clock circuit to compare the current time to the approximate scheduled time of arrival;
  comparing the currently indicated location to a previously updated location;
  comparing the indicated location of one container to the indicated location of other containers that are supposed to be traveling together;
  using cellular radio signals; and,
  using LEO satellite signals.

11. The system of claim 8 wherein said sensing device is selected from the group consisting of: thermal sensors; chemical sensors; radiation sensors; humidity sensors; air pressure sensors; load cells; accelerometers; tip and tilt sensors; shock sensors; tamper switches; and RFID sensing devices.

12. The system of claim 8 wherein said communication system is configured to communicate wirelessly using a communication mode selected from the following group: serial mesh radio; quadband GSM cellular; and LEO Satellite.

13. The system of claim 8 wherein said system monitor further includes a secure, web-based tracking system configured to allow selected users to manage assets in real-time via the Internet.

14. The system of claim 8 further including an input/output device selected from the following group: keypads; USB ports; and wireless data links.

* * * * *